United States Patent
Dell et al.

(10) Patent No.: US 6,445,744 B1
(45) Date of Patent: Sep. 3, 2002

(54) HIGHSPEED EXTENDABLE BUS ARCHITECTURE

(75) Inventors: Timothy Jay Dell, Colchester; Wilbur David Pricer, Charlotte, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,825

(22) Filed: Jan. 4, 1999

(51) Int. Cl.[7] .......................... H04K 1/10; H04L 27/28
(52) U.S. Cl. ...................... 375/260; 375/288; 341/100
(58) Field of Search ................................ 375/256, 257, 375/259, 260, 265, 341, 288; 370/535, 536, 366; 714/794, 795; 341/57, 56, 100, 101; 333/1

(56) References Cited

U.S. PATENT DOCUMENTS

| | | | |
|---|---|---|---|
| 4,020,282 A | * | 4/1977 | Halpern |
| 4,293,949 A | | 10/1981 | Philippides |
| 4,608,702 A | | 8/1986 | Hirzel et al. |
| 5,034,967 A | | 7/1991 | Cox et al. |
| 5,046,072 A | | 9/1991 | Shimizu et al. |
| 5,525,983 A | * | 6/1996 | Patel et al. .................... 341/57 |
| 5,612,958 A | | 3/1997 | Sannino |
| 5,640,605 A | * | 6/1997 | Johnson et al. |

* cited by examiner

Primary Examiner—Jean Corrielus
(74) Attorney, Agent, or Firm—Schmeiser, Olsen & Watts; Robert A. Walsh (57) ABSTRACT

A highspeed bus architecture featuring low signal levels, differential sensing, and zero net current over a four wire transmission line cluster. The bus system comprises a system for transmitting n bits of data and includes an encoding system for receiving the n bits of data and outputting m signals wherein the m signals have a zero net current, m transmission lines for carrying the m signals, and a decoding system for receiving the m signals and converting the m signals back into n bits of data, using differential amplifiers.

4 Claims, 6 Drawing Sheets

| TYPICAL BINARY CODE | | | VOLTAGES ON BUS | | | | FIG. 2 SWITCH SETTINGS | | |
|---|---|---|---|---|---|---|---|---|---|
| A | B | C | | | | | | | |
| 1 | 1 | 1 | 0 | -1 | +1 | 0 | L | L | L |
| 0 | 1 | 1 | -1 | 0 | +1 | 0 | R | L | L |
| 1 | 0 | 1 | 0 | -1 | 0 | +1 | L | R | L |
| 0 | 0 | 1 | -1 | 0 | 0 | +1 | R | R | L |
| 1 | 1 | 0 | +1 | 0 | 0 | -1 | L | L | R |
| 0 | 1 | 0 | 0 | +1 | 0 | -1 | R | L | R |
| 1 | 0 | 0 | +1 | 0 | -1 | 0 | L | R | R |
| 0 | 0 | 0 | 0 | +1 | -1 | 0 | R | R | R |

BOTTOM LEFT SWITCH SET TO:
BOTTOM RIGHT SWITCH SET TO:
TOP SWITCH SET TO:

TWISTED PAIRS WITH STAGGERED PERIODICITY

HIGHSPEED EXTENDABLE BUS ARCHITECTURE

BACKGROUND OF THE INVENTION

1. Technical Field

The present invention relates to transmission systems, and more particularly relates to high speed bus architectures.

2. Related Art

While new microprocessors continue to process data at ever increasing speeds, the rate at which data can be delivered to the microprocessor, i.e., the bus speed, has failed to keep pace. Thus, an important challenge for system designers is how to increase bus speeds so that high speed microprocessors are not bogged down waiting for data. In particular, new techniques are sought that can increase the rate of data flow from memory devices, such as dynamic random access memory (DRAM) to the microprocessor in order to allow high speed microprocessors to operate at their designed speeds.

Unfortunately, several critical factors exist that relate to the speed at which a bus can deliver data. The most important relates to the fact that faster bus speeds are more susceptible to problems associated with noise. Furthermore, as bus signal levels decrease, noise becomes more and more problematic. Thus, higher voltage bus signals are preferable in eliminating noise. Unfortunately, it generally takes a longer amount of time to switch a high voltage signal as compared with a low voltage signal because a larger current drive is required.

A final consideration relates to power, which is particularly important for mobile systems, such as laptops and portable phones. High speed bus systems generally require a higher amount of power, which can be counter to what is required for a particular application. High speed busses tend to draw a large amount of power because present bus architectures require transmission line techniques with resistive termination on at least one end of each transmission line, or more frequently, on both ends. By requiring terminating resistors on a bus, significant power dissipation is introduced into the system. Thus, attempting to drive full CMOS logic levels over resistively terminated transmission lines leads to large and cumbersomely slow drivers with high power dissipation. While smaller, faster drivers with less skew are available, they produce less than full CMOS logic levels when driving typical terminated transmission line impedances. While smaller logic levels are possible, they tend to be more susceptible to ambient noise unless protected by some special technique.

As is evident, competing factors exist that make it difficult to provide a high speed, low power, noise free bus architecture. Although various attempts have been made to overcome these issues, no inexpensive solutions presently exist.

SUMMARY OF THE INVENTION

The present invention overcomes the above-mentioned problems in the related art by providing a bus system that can transmit n-bit packets of binary data, the bus system comprising: an encoder system on the transmission end for converting each n-bit packet of data into a unique set of m signals, wherein the m signals have a net current sum of zero; m transmission lines for transmitting the m signals; and a decoder on the receiving end for receiving the m signals and converting them back to the original n-bit packet of data. In order to provide a net current sum of zero, the encoder comprises drivers for providing signals of differing polarities.

By providing a set of signals with a zero sum net current, the transmission lines no longer require an external reference (e.g., ground) for a return signal. Rather, the circuit is completed within the transmission lines themselves. Because the invention eliminates the need for an external reference, noise problems associated with voltage differences between the external reference and the transmission line are eliminated. Thus, relatively low voltage signals may be utilized, for example, only fifty or a hundred millivolts.

The invention further features differential sensing on the receiving end in order to convert the mixed polarity m signals back into binary data. In addition, the m signal lines can be utilized to accurately transmit a relativistic clock as part of the data and therefore avoid most signal-to-clock skew problems.

Finally, because of the simplicity of the design, the system can be easily replicated to handle multiple n-bit packets therefore providing an extendable system having a virtually unlimited bus width.

The foregoing and other objects, features and advantages of the invention will be more apparent in the following and more particular description of the embodiments of the invention as illustrated in the accompanying drawings.

BRIEF DESCRIPTION OF DRAWINGS

The exemplary embodiment of the present invention will hereinafter be described in conjunction with the appended drawings, where like designations denote like elements, and.

DETAILED DESCRIPTION OF THE INVENTION

Figure 1:
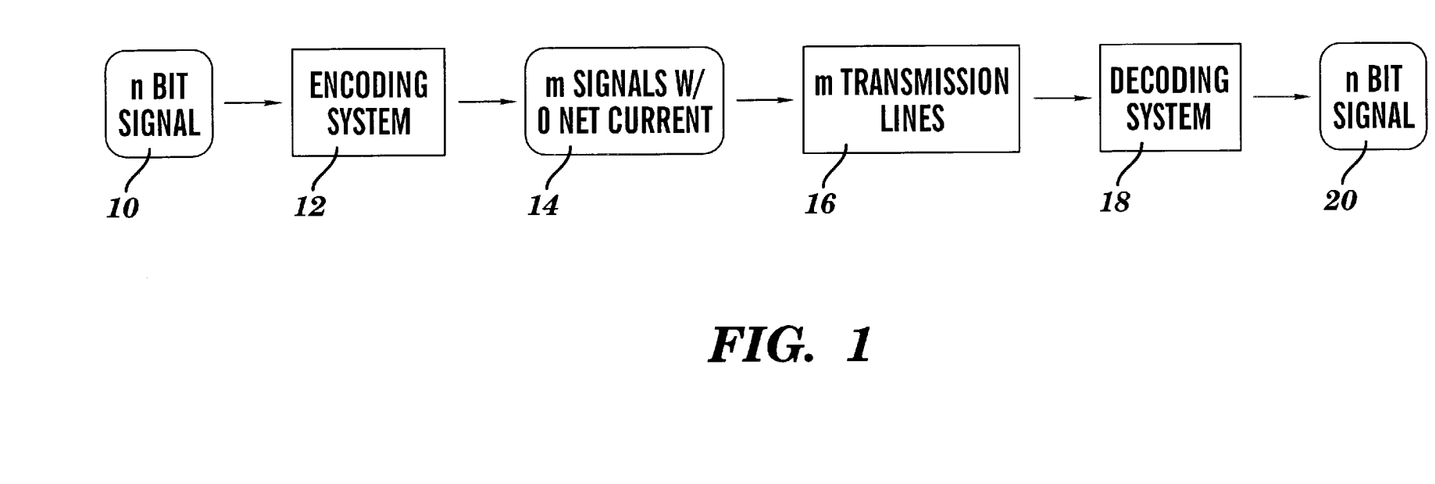
FIG. 1 depicts a high level system diagram of a bus system in accordance with an embodiment of the present invention.

Referring now to FIG. 1, a high level diagram of a bus system in accordance with the present invention is depicted. First, an n bit signal 10 is passed into encoding system 12 and converted into m signals having a net current sum of zero. The n bit signal may comprise any type of information including data, instructions, clock signals, or combinations thereof. The encoding system 12 generally comprises logic elements and current drivers that convert the n bit value (e.g., 001) into m signals of differing polarity (e.g., +1, 0, −1, 0). Each possible value in the n bit set will have a unique set of m signals. Moreover, each set of m signals have a net current sum of zero, i.e., the sum of the currents for each of the m signals is zero. A zero net current sum is achieved by using signals of opposite polarity within each set of m signals. The encoding process is explained in more detail with reference to FIGS. 2–5 below.

Once encoded, the m signals are placed onto a cluster of m transmission lines 16 that carry and transmit the m signals. Because the m signals have a net current sum of zero, no reference, ground, or return circuit is required for the transmission lines. At the receiving end of the m transmission lines, a decoding system 18 decodes the m signals and generates the original n bit binary value 20. The decoding process may utilize a differential sensing process to recreate the original n-bit value, the process of which is described with reference to FIGS. 2 and 6–7.

Figure 2:
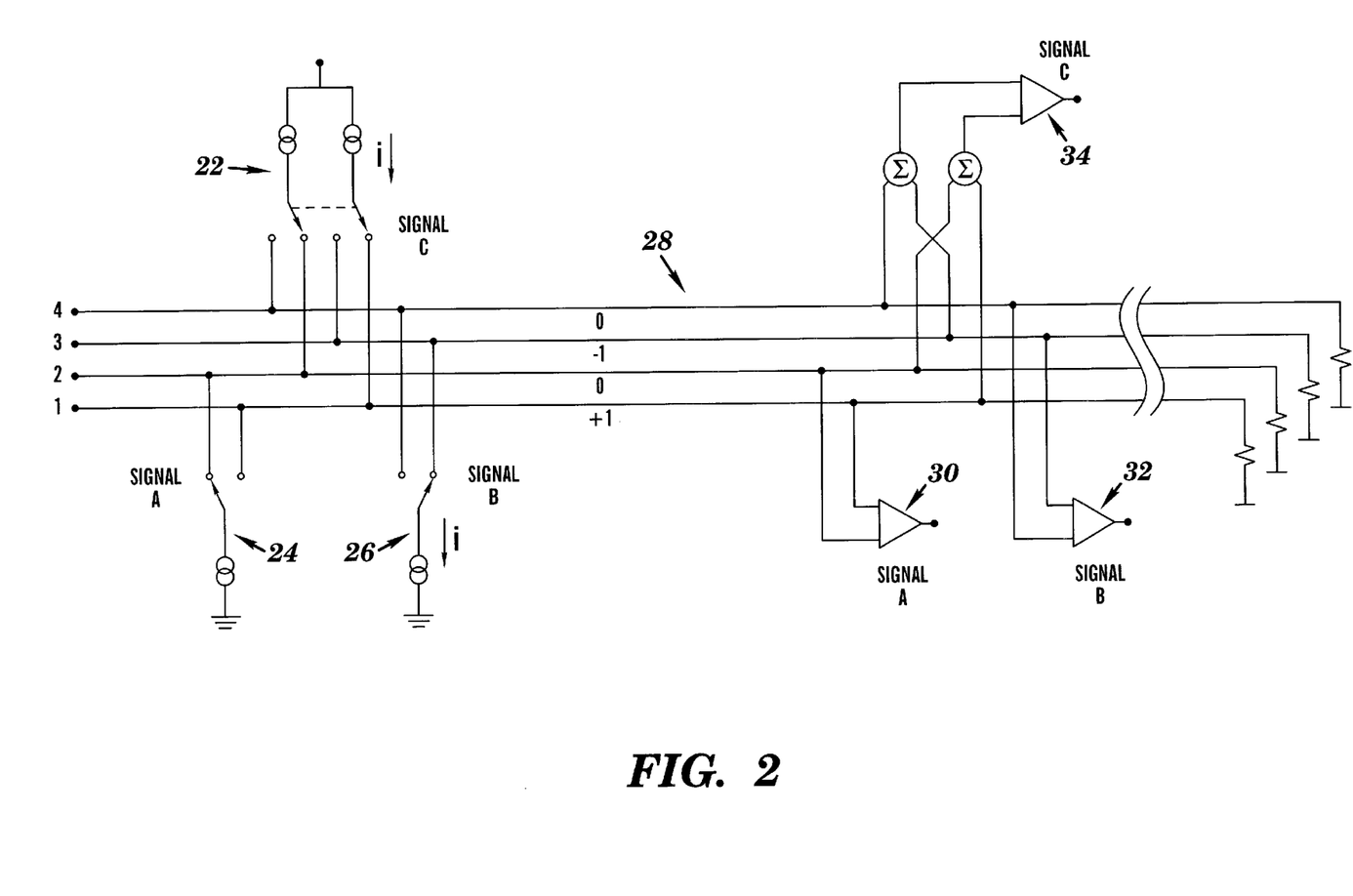
FIG. 2 depicts a circuit diagram of a four wire bus system in accordance with an embodiment of the present invention.

FIG. 2 depicts an embodiment of the bus architecture of the present invention. The bus system includes a cluster 28 of four transmission lines 1, 2, 3, and 4, three switchable current sources 22, 24, and 26 at a transmitting end of the bus, and three differential amplifiers 30, 32, and 34 at the receiving end of the bus. Pursuant to this embodiment, the cluster 28 of four transmission lines are utilized to transmit three bits of data, i.e., signals A, B and C. At the transmitting end, the three signals containing binary data are encoded into four signals having a net current sum of zero. The encoding process is accomplished with the current drivers 22, 24, and 26. Each of the three current sources 22, 24, and 26 corresponds to a unique one of the three signals A, B, and C. In operation, each driver is switched to either a left position (for encoding a binary 1) or a right position (for encoding a binary 0).

Figure 3:
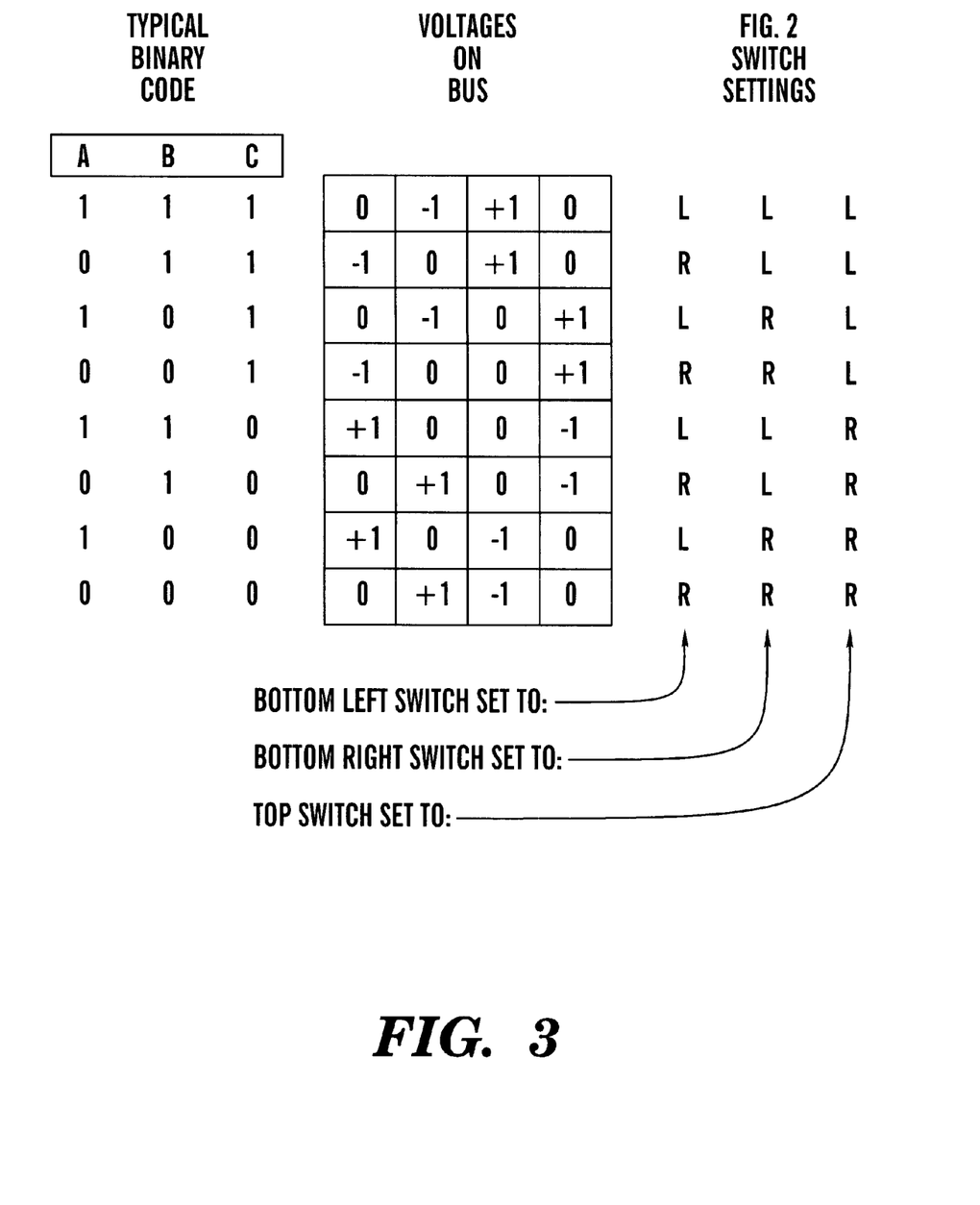
FIG. 3 depicts a truth table for the circuit of FIG. 2, in accordance with an embodiment of the present invention.

The bottom left current driver 24 is used to encode signal A by providing a negative voltage onto either line 2 (left position, as shown), or line 1 (right position). Bottom right current source 26 is used to encode signal B by providing a negative voltage onto line 4 (left position) or line 3 (right position, as shown). The top current driver 22 is used to encode signal C and provides a positive voltage onto either lines 4 and 3 (the left position) or lines 2 and 1 (the right position, as shown). Because current driver 22 drives two lines, it will have a magnitude equal to the sum of the bottom two drivers 24 and 26. According to this configuration, driver 22 will drive one of the transmission lines to +1, and along with one of the bottom drivers 24 or 26, cause a second line to be driven to 0. The other bottom driver will drive a third line to −1. Finally a fourth line will remain unaffected and therefore remain at 0. Accordingly, the resulting switch settings for a given 3 bit value will always generate four signals of voltages +1, 0, 0, and −1, guaranteeing that there is no net current for the sum of all four wires. A truth table for encoding 3 bits of information into four signals is illustrated in FIG. 3, which is described below.

By providing a system with no net ground return current, minimal "ground plane bounce" is induced. Ground plane bounce results when the ground plane is subject to some sort of interference, such as high return currents on the transmission lines or when some unrelated component causes an instantaneous bounce or spike on the reference voltage of the ground plane. When this happens, the voltage drop between a signal on the transmission line and the ground plane may no longer represent an accurate value, and therefore potentially lead to bad data. Since the present system is a transmission system with return circuit "built-in" to the transmission line cluster, a ground plane is not required, except to provide general printed circuit card shielding and impedance control.

Figure 6:
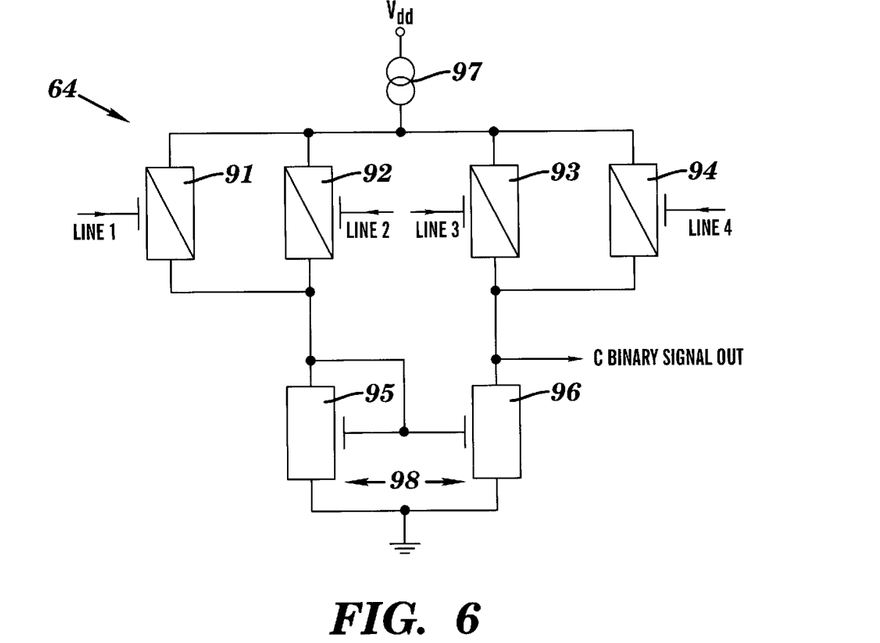
FIG. 6 depicts a first receiver circuit implementation for the circuit of FIG. 2, in accordance with an embodiment of the present invention.
Figure 7:
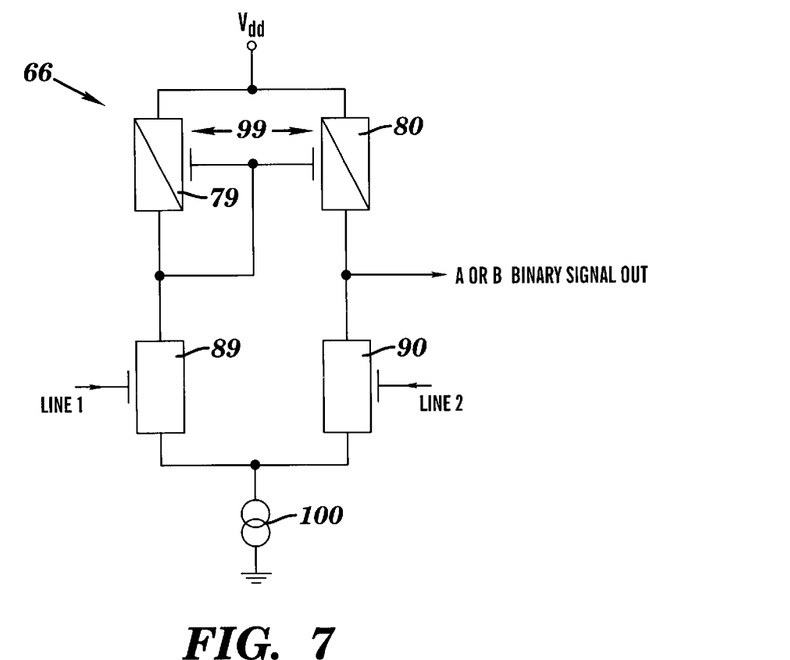
FIG. 7 depicts a second receiver circuit implementation for the circuit of FIG. 2, in accordance with an embodiment of the present invention.

The four encoded signals are decoded at the receiving end of the bus via a decoder system comprised of three differential amplifiers 30, 32, and 34. Each differential amplifier outputs either a binary 1 or 0, depending on a difference between two inputted values. Positive results are converted into binary 1's, while negative results are converted into binary 0's. Example circuits for the differential amplifiers are shown in FIGS. 6 and 7. Differential amplifier 30 is used to decode signal A by examining the voltages on lines 1 and 2. For purposes of simplified illustration it is assumed that the signal levels on the transmission lines are +1 volts, 0 volts, and −1 volts. In the case shown, line one has 1 volt and line 2 has 0 volts, resulting in an output of binary 1. Differential amplifier 32 decodes signal B in a similar manner by taking the voltage difference between lines 3 and 4. In the case shown, line three has −1 volts, while line 4 has 0 volts, resulting in an output of binary 0. Differential amplifier 34 decodes signal C with the use of two summation devices. The first summation device adds or averages the voltages from lines 3 and 4, while the second summation device adds or averages the voltages from lines 1 and 2. The result of those two summations are then evaluated by differential amplifier 34 to provide signal C. In the case shown, a difference of −1 would result, thereby causing a binary 0 to be output. Thus, the decoded value for the switch setting of FIG. 2 would be 100, which corresponds to the original left, right, right switch settings of the current sources 22, 24 and 26. Accordingly, the differential amplifiers of FIG. 2 have been designed to maximize common mode rejection and therefore minimize noise.

The cluster 28 of four wires may be combined with additional "parallel" clusters to provide an unlimited bus width. The number of clusters will depend on the required byte size of the particular application. In addition, signal C may comprise a clock signal that is transmitted synchronously with data in signals A and B. Accordingly, signal-to-clock skew problems are avoided since the clock will travel along the same wire path as the data signals. In such an embodiment, the clock signal could be used to commutate (multiplex) the data prior to transmission, and then de-multiplex the data at the receiving end.

Figure 10:
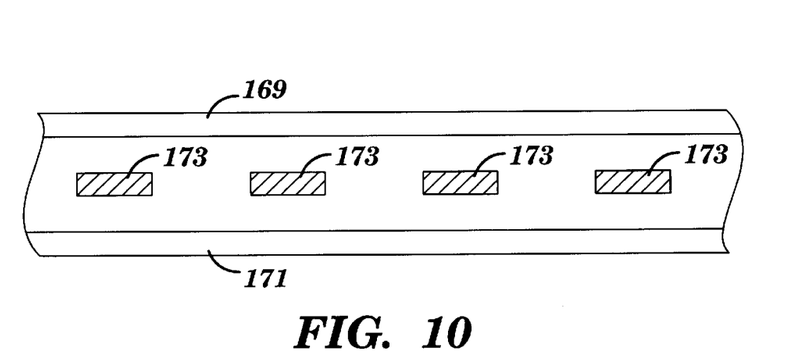
FIG. 10 depicts transmission lines between two planes in accordance with an embodiment of the present invention.

It is understood that while FIG. 2 depicts a system with a voltage magnitude of 1, smaller or larger voltage levels may be utilized. For example, 50 or 100 millivolts signals may be used. The only critical limitation is that the net current sum of the four signals on the cluster 28 is equal to zero. It is also recognized that the transmission lines may reside between two ground planes, two voltage planes, or a ground and voltage plane. FIG. 10 depicts a cluster of four wires 173 residing between a top 169 and bottom 171 plane. Finally, it is understood by those skilled in the art that the inventive concept will work equally as well with the signal and voltage polarities of the described encoders and decoders reversed.

Referring now to FIG. 3, a truth table for each three bit binary codes is shown. The table determines the switch settings of the current sources 22, 24, and 26 of FIG. 2, along with the bus voltages of FIG. 2. For example, in FIG. 2 it can be seen that the switch settings are L, R, R, indicating that a binary code of 100 is to be transmitted over cluster 28. Referring to the truth table, it can be seen that line values therefore of +1, 0, −1, and 0, respectively, are to be transmitted over lines 1–4. As can be seen, each binary code has its own unique switch setting, which in turn, causes a unique set of four signals to be transmitted over the bus lines, each of which having a net current sum of zero.

Figure 4:
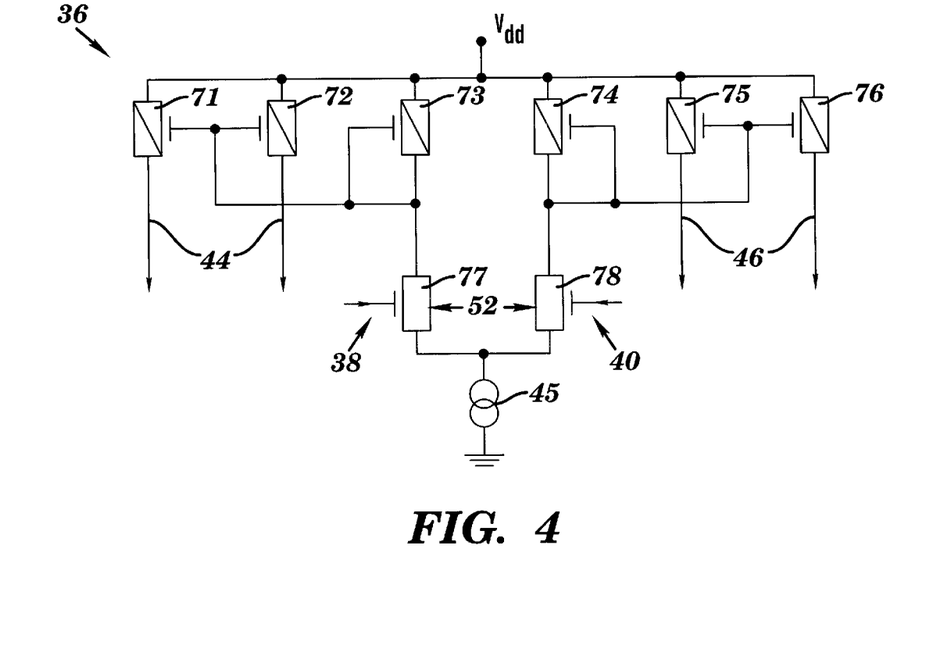
FIG. 4 depicts a first driver circuit implementation for the circuit of FIG. 2, in accordance with an embodiment of the present invention.

Referring now to FIG. 4, an example current driver circuit 36 is depicted. This particular driver circuit 36, which features a split current source 45, is one possible example that could be implemented to encode signal C (i.e., driver 22 of FIG. 2). Driver circuit 36 also includes a steering circuit 52, composed of FETs 77 and 78, which serves to steer the current source output into either the left side (FETs 71, 72, 73) or right side (FETs 74, 75, 76) of each sub circuit. Based on the desired switch settings (of the current sources 22, 24 and 26 of FIG. 2), either the left input 38 or right input 40 is selected, causing a positive current from voltage source (Vdd) to pass to left 44 or right 46 output pair of the circuit 36, respectively. A split current source 45 is provided since this circuit 36 is required to drive two lines, as described above.

Figure 5:
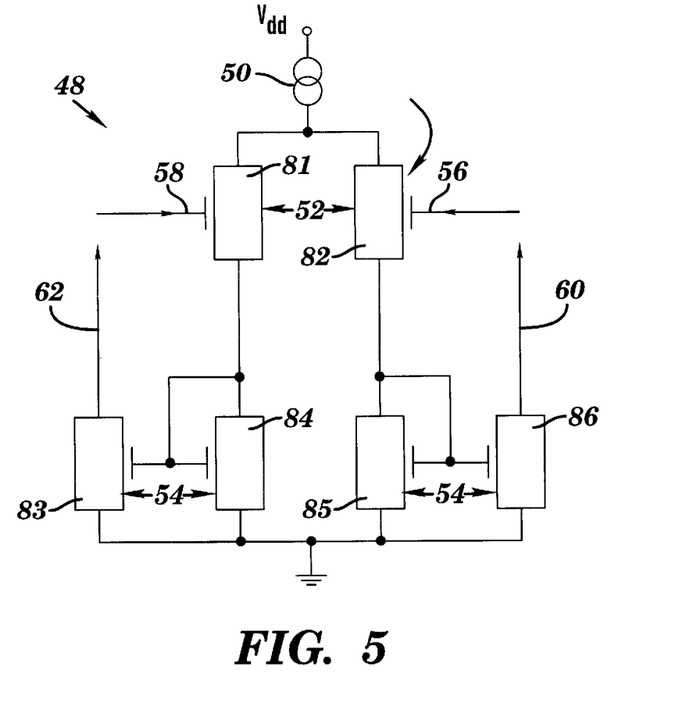
FIG. 5 depicts a second driver circuit implementation for the circuit of FIG. 2, in accordance with an embodiment of the present invention.

FIG. 5 depicts a current driver implementation suitable for encoding signals A or B (i.e., drivers 24 or 26 of FIG. 2). The circuit 48 comprises a left input 58 and a right input 56 that steer the output of split current source 50, via steering circuit 52, composed of FETs 81 and 82, either to the left side 62 or right side 60 output, respectively. In this case, a negative current from ground potential will be passed to either of outputs 62, 60 in order to provide the necessary negative voltage level. A split current source 50 is provided since this circuit 48 is required to drive two lines, as described above.

The embodiments of FIGS. 4 and 5 illustrate one set of circuits that can be used in the scheme shown in FIG. 2. Each of the circuits include an FET pair (e.g., 52, composed of FETs 77 and 78 in FIG. 4, or 81 and 82 in FIG. 5) that steers a current source 45, 50 into either the left or right side of each sub circuit. Inside of each sub circuit, a current mirror (e.g., 54, composed of FETs 83 and 84, or 85 and 86) receives the switched current source, replicates that current, and drives the replicated circuit onto the transmission line cluster. Obviously, it is understood that many other embodiments are possible. This particular example is preferable because it provides a convenient open circuit output impedance to the transmission line both when the driver is active and when the driver is unselected. In the case of the split current source 45 of FIG. 4, each current mirror is split in order to drive two transmission lines.

Referring now to FIGS. 6 and 7, two possible decoder circuits 64 and 66, respectively, are depicted. Decoder circuit 64 is suitable for decoding signal C, while decoder circuit 66 is suitable for decoding signals A and B. Decoder circuit 64 receives as inputs to FETs 91, 92, 93, 94 the signals from each of the four lines in the cluster, i.e., lines 1 and 2, and lines 3 and 4, respectively. Decoder circuit 64 has the effect of summing or averaging signals from each respective pair of inputs (i.e., lines 1 and 2, and lines 3 and 4), determining a difference, and outputting a value of 1 or 0 from current mirror 98, composed of FETs 95 and 96. Similarly, decoder circuit 66 receives as input the signals from a first and a second line, to FETs 89 and 90, respectively, determines a difference, and likewise will output either a 0 or 1 from current mirror 99, composed of FETs 79 and 80. Each of decoder circuits 64 and 66 further includes a voltage supply Vdd and a split current source 97 or 100, respectively. Obviously, these decoder circuits could be implemented in a different manner without departing from the scope of this invention.

Figure 8:
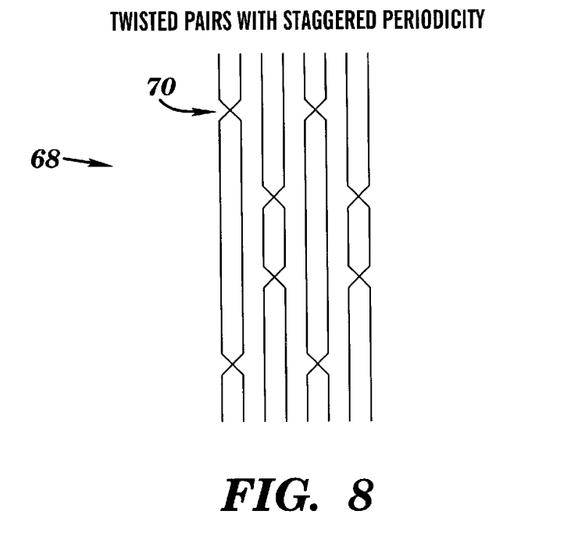
FIG. 8 depicts bus wires that comprise twisted pairs in accordance with an embodiment of the present invention.

Referring now to FIG. 8, an eight line bus (i.e., two clusters of four wires) is shown. In the embodiment depicted, the transmission lines are twisted 70 in order to reduce differential mode noise. The twisting of the lines may be also staggered to provide a more robust design. In addition, the transmission lines may be sandwiched between two ground planes or ground and voltage planes in order to reduce line to line coupling, establish uniform transmission line characteristics, and thereby introduce a minimal amount noise. Where noise is introduced by the ground or voltage planes, it is primarily common mode noise which the invention is designed to reject. Because the individual lines will likely not be completely shielded by the ground or voltage plane, there remains some line to line coupling capable of introducing differential mode noise. By twisting alternate pair of wires at different periodicity the existence of differential mode noise can be eliminated. In this embodiment each transmission line pair has an equal number of twists per unit length.

Figure 9:
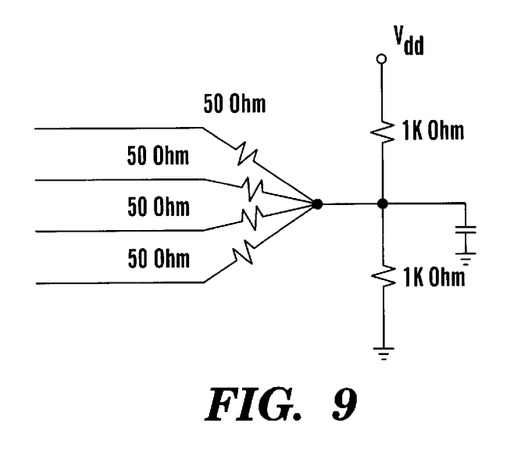
FIG. 9 depicts a circuit termination diagram in accordance with an embodiment of the present invention.

Referring now to FIG. 9, a termination point of the transmission lines of the present invention is depicted in order to show how the invention avoids significant power dissipation in the terminating resistors. Because the signal swing can be intentionally set low, there will be very little drive power, and very little drive power dissipated in the resistive termination. Because the nominal signal value is in between the power supply and ground, it would appear that the potential exists for significantly more DC power in the resistive termination. However, as shown in FIG. 5, because the present embodiment delivers no net current into the four wire clusters, the nominal termination voltage can be determined with much higher valued resistors than the transmission line termination impedance. In the example shown in FIG. 9, this is evident as two 1 K Ohm (voltage biasing) resistors are used to determine the nominal voltage volume for a 50 Ohm termination. Nonetheless, it is recognized that significant power reduction can be achieved with terminating resistors as low as two times the characteristic impedance of the transmission line. The ability to reduce power in this manner is particularly useful for portable battery powered equipment where the total battery drain is an important consideration.

The foregoing description of the embodiments of the invention have been presented for purposes of illustration and description, they are not intended to be exhaustive or to limit the invention to the precise form disclosed, and obviously many modifications and variations are possible in light of the above teachings. Such modifications and variations that may be apparent to a person skilled in the art are intended to be included within the scope of this invention as defined by the accompanying claims.

We claim:

1. A bus system for transmitting three binary values in parallel, comprising:
    a cluster of four transmission lines;
    an encoding system for encoding the three binary values into four bus signals and for transmitting the four bus signals over the cluster of four transmission lines, wherein the four bus signals have a net current sum of zero, wherein the encoding system further comprises:
        a first current source for selectively providing a negative signal onto either a first or a second line;
        a second current source for selectively providing a negative signal onto either a third or fourth line; and
        a third current source for selectively providing a positive signal onto either the second and fourth lines or the first and third lines; and
    a decoding system for decoding the four bus signals back into the three binary values.

2. A bus system for transmitting three binary values in parallel, comprising:

a cluster of four transmission lines;

an encoding system for encoding the three binary values into four bus signals and for transmitting the four bus signals over the cluster of four transmission lines, wherein the four bus signals have a net current sum of zero, wherein the encoding system further comprises:

a first current source for selectively providing a positive signal onto either a first or a second line;

a second current source for selectively providing a positive signal onto either a third or fourth line; and a third current source for selectively providing a negative signal onto either the second and fourth lines or the first and third lines; and a decoding system for decoding the four bus signals back into the three binary values.

3. The bus system of claim 2, wherein the decoding system comprises:

a first differential amplifier having inputs coupled to the first and second lines;

a second differential amplifier having inputs coupled to the third and fourth lines; and a third differential amplifier having a first input comprising a sum of the third and fourth lines, and a second input comprising a sum of the first and second lines.

4. The bus system of claim 2, wherein the decoding system comprises:

a first differential amplifier having inputs coupled to the first and second lines;

a second differential amplifier having inputs coupled to the third and fourth lines; and a third differential amplifier having a first input comprising an average of the third and fourth lines, and a second input comprising an average of the first and second lines.

* * * * *